United States Patent [19]

Barfurth et al.

[11] Patent Number: 4,909,846
[45] Date of Patent: Mar. 20, 1990

[54] COMPOSITIONS BASED ON TITANIUM CHELATES OF DIOLS AND TITANIUM ACYLATES

[75] Inventors: Dieter Barfurth; Heinz Nestler, both of Troisdorf-Spich, Fed. Rep. of Germany

[73] Assignee: Huels Troisdorf AG, Troisdorf, Fed. Rep. of Germany

[21] Appl. No.: 264,697

[22] Filed: Oct. 31, 1988

[30] Foreign Application Priority Data

Oct. 31, 1987 [DE] Fed. Rep. of Germany ....... 3737047

[51] Int. Cl.[4] .................. C09D 11/00; C09K 3/00
[52] U.S. Cl. ................................ 106/22; 106/194; 106/195; 106/287.19; 556/54
[58] Field of Search .................. 106/287.19, 194, 22, 106/195; 556/54.55, 40

[56] References Cited

U.S. PATENT DOCUMENTS

| 4,113,757 | 9/1978 | Kay ........................................ 556/54 |
| 4,578,487 | 3/1986 | Barfurth .................................. 556/40 |
| 4,609,746 | 9/1986 | Barfurth .................................. 556/40 |

*Primary Examiner*—Theodore Morris
*Attorney, Agent, or Firm*—Felfe & Lynch

[57] ABSTRACT

Titanium chelate - based compositions are used as additives for liquid or pasty coating agents, especially printing inks; they consist of a mixture of titanium chelates of saturated diols and titanium acylates of saturated monocarboxylic acids.

10 Claims, No Drawings

COMPOSITIONS BASED ON TITANIUM CHELATES OF DIOLS AND TITANIUM ACYLATES

FIELD OF THE INVENTION

This invention relates to compositions containing titanium chelates of alkylene diols and titanium monocarboxylic acylates.

These compositions are especially useful as additives for printing inks in order to impart to these printing inks an improved adherence to difficultly printable substrates such as polypropylene foils, for example.

BACKGROUND OF THE INVENTION

For a number of years diisopropoxy titanium (IV)-bisacetylacetonate, titanium-acetylacetonate for short, has been successfully used for this purpose. The disadvantage of titanium acetylacetonate resides in its own dark red color and in the discoloration of materials to which it was added, which is particularly noticeable with printing inks, especially, with white printing inks.

In the search for titanium-based, non-discoloring, adhesion promoting additives the following criteria should be met:
(a) Compatibility with printing ink binders. Upon addition of the additives no gel formation of the printing ink must occur. Increase in viscosity due to cross-linking should not occur;
(b) The additive should have as little color of its own as possible;
(c) Sufficient adhesion promoting effect.

The titanium chelate of 2-ethyl-hexanediol-1,3 (also referred to as octylene glycol) with a molar ratio of 4:1, OGT-HV for short, meets requirements (a) and (b), but is not sufficiently effective as an adhesion promoter in a nitrocellulose printing ink on polypropylene foil. The standard set by titanium acetylacetonate was not achieved.

OBJECTS OF THE INVENTION

It is therefore an object of the present invention to provide titanium-based compositions which possess an adequate adhesion promoting affect and, when used as an additive, discolor and alter pasty or liquid substances and substance mixtures, especially printing inks, as little as possible.

Other objects and advantages of the present invention will become apparent as the description thereof proceeds.

DESCRIPTION OF THE INVENTION

We have made the surprising discovery that mixtures of titanium-chelates of saturated diols and titanium monocarboxylic acylates produce improvements of adhesion which are superior or equivalent to those produced by the addition of the same amounts of titanium acetylacetonate. These mixtures, however, have the advantage that they do not have a yellowing, discoloring or otherwise altering affect on printing inks, especially white printing inks.

The titanium chelates of saturated diols and titanium acylates should be present in the compositions of the present invention in a weight ratio of 4:1 to 1:3.

Among the titanium chelates of saturated diols, 1,3-diols are preferred. The diols should contain 3 to 12 carbon atoms, preferably 6 to 10 carbon atoms. Suitable diols are especially 2-ethyl-hexanediol-1,3, 2-methyl-pentanediol-2,4 and propanediol-1,3. The diol radicals form a primary valence and, together with the second hydroxyl group, a secondary valence in the manner of chelates with respect to the titanium. The titanium chelates are formed from alkyl titanates (tetraalkoxy titanium), of which those with 2 to 4 carbon atoms in the alkoxy group are preferred. 2 to 4, preferably 3 to 4 mols of diol are bonded with titanium, whereby up to 2 alkoxy radicals remain bonded to titanium.

The titanium acylates correspondingly contain 1 to 4, preferably 2 to 3 radicals of the saturated monocarboxylic acid and correspondingly up to three alkoxy radicals. The acylates are not chelates. The saturated carboxylic acids are especially aliphatic monocarboxylic acids with 3 to 18 carbon atoms, preferably 3 to 12 carbon atoms.

The reaction for the formation of the chelates and the acylates already takes place at 20° to 90° C., preferably at 20° to 60° C., under normal pressure. This method makes it possible to first prepare the titanium diol chelates and the titanium acylates separately and subsequently admix them in the desired ratio. Mixed titanates with diol radicals and radicals of the monocarboxylic acids may also be prepared and used for the preparation of the chelates. For this purpose the diols and monocarboxylic acids are reacted, preferably one after the other, with the calculated amount of alkyl titanate.

In the chelates and acylates as well as in the mixed titanates the alcohol can be removed by distillation, or the alcohol formed by the reaction can be entirely or partially retained.

Among the acylates, especially the reaction products with two mols of carboxylic acid per mol of titanium are only slightly yellow in color and therefore meet criterion b. However, it is surprising that mixtures of the chelates and the acylates meet all of the criteria (a) to (c) better than the chelates and acylates by themselves. With respect to the compatibility of the compositions with printing inks (criterion b), we determined that the addition of amounts above 2% by weight caused thickening or gel formation to occur, depending upon the type of carboxylic acid which was used, which surprisingly does not occur when the compositions of chelates and acylates are used. Thus, titanium acylates can be added to printing ink only within certain limits, although they also produce a adhesion promoting effect which, however, is weaker than that produced by the chelates of the diols. But the adhesion promoting effect of the compositions exceeds the adhesion promoting effect of each of the two components.

Compositions of mixtures of the titanium chelates of diols and the titanium acylates or the corresponding mixed titanates according to the present invention surprisingly produce no thickening or gel forming effect and therefore completely meet the above mentioned object.

The compositions are prepared by simply mixing the two titanium compounds. If the alcohols formed during the preparation of each of these substances are not removed or only partially removed, it is advantageous if these alcohols are also contained in the compositions. However, in addition to alcohols with 2 to 4 carbon atoms, glycols of the same chain length and glycol ethers of these alcohols of corresponding chain length may be present as solvents. The amount of the solvents contained in the compositions can amount up to 60% of the composition.

The compositions according to the present invention can be used as additives for liquid or pasty coating agents which are to be imparted with increased adhesion to a substrate. More particularly, the compositions are to be used as additives for solvent-containing printing inks. Especially flexographic printing inks based on nitrocellulose by itself or in admixture with maleinate resin, cellulose esters, polyimides or the like, are imparted with an increased adhesion strength by virtue of the compositions according to the present invention, whereas undesirable alterations pursuant to criterion (a) above do not occur. The additives are added in the range of 0.5 to 7, preferably 1.5 to 4.5% by weight. Compared to known titanium-based additives, the compositions according to the present invention have the significant advantage that they practically do not alter the color of printing inks and other liquid or pasty coating agents, and also that they have a less pronounced effect upon their viscosity than, for example, titanium acetylacetonate additives. Moreover, no color-intensifying reaction between additive and antioxidants in the coating agent or substrate can be observed.

The following examples illustrate the present invention and will enable others skilled in the art to understand it more completely. It should be understood, however, that the invention is not limited solely to the particular examples given below.

EXAMPLE 1

Preparation of the 2-ethyl-hexanediol-1,3 titanium chelate (OGT), molar ratio 4:1.

241.4 g (0.85 mol) of isopropyl titanate were placed into a 1000 ml round bottom flask equipped with a stirrer, a thermometer, a dropping funnel and a condenser, and the contents were admixed in small portions by means of the dropping funnel with 496.4 g (3.4 mols) of 2-ethyl-hexanediol-1,3 at a rate such that the temperature of the reaction mixture did not rise above 70° C. After all of the diol had been added, the mixture was stirred for 30 minutes at 70° C., and the isopropanol liberated by the reaction was subsequently distilled off.

After removal of about 75% of the theoretically calculated amount of isopropanol under normal pressure, the separation was continued under reduced pressure until 200.9 g of isopropanol (3.34 mols=98.5% of theory) were removed from the reaction mixture.

A yellowish, highly viscous liquid with the following characteristic values was obtained:

| Index of refraction $n_D^{20}$ 1.495 | |
|---|---|
| Viscosity at 20° C. | 3500 mPa.s |
| Density at 20° C. | 1.03 g/ml |
| TiO$_2$ content | 13.0% by weight |
| Flash point 50° C. (DIN 51 755) | |
| Solubility | |
| (a) in water | 0.1% by weight |
| (b) in organic solvents: miscible with aliphatic, aromatic and chlorinated hydrocarbons, with alcohols, esters and ketones. | |

EXAMPLE 2

Preparation of 2-methyl-pentanediol-2,4 titanium chelate, molar ratio 3:1.

238 g (0.7 mol) of butyl titanate were placed into a 1000 ml round bottom flask equipped with a stirrer, a dropping funnel, a thermometer and a condenser, and the contents were admixed in small portions with 247.8 gm (2.1 mols) of 2-methyl-pentanediol-2,4. The temperature rose to 30° C. The reaction was complete after one hour. A chelate with three diol radicals and one butoxy radical was obtained. The butanol released by the reaction remained in the reaction product.

An orange colored liquid was obtained, from which crystals gradually separated upon standing.

| Viscosity at 20° C. | 39 mPa.s |
|---|---|
| Density at 20° C. | 0.96 g/ml |
| TiO$_2$ content | 11.5% |

The solubilities correspond to those shown in Example 1.

EXAMPLE 3

Preparation of the titanium-acylate of 1 mol butyl titanate and 2 mols of caproic acid.

340 g (1 mol) of butyl titanate were placed into a 1000 ml round bottom flask equipped with a stirrer, a thermometer, a dropping funnel and a condenser, and the contents were slowly admixed by means of the dropping funnel with 232 g (2 mols) of caproic acid (hexanoic acid), so that the temperature of the reaction mixture did not rise above 50° C. After all of the caproic acid had been added, the reaction mixture was stirred for 30 minutes at 80° C. A yellowish, easily mobile liquid with the following characteristic values was obtained:

| Index of refraction $n_D^{20}$ | 1.461 |
|---|---|
| Viscosity at 20° C. | 9.5 mPa.s |
| Density at 20° C. | 0.97 g/ml |
| TiO$_2$ content | 14.0% by weight |
| Flash point 38° C. (DIN 51 755) | |
| Solubility | |
| (a) water in titanium acylate 0.1% by weight | |
| (b) titanium acylate in water: 0.1% by weight | |
| (c) in organic solvents: miscible with alcohols, esters, ketones, aromatic and aliphatic hydrocarbons. | |

EXAMPLE 4

Preparation of the titanium acylate of 1 mol butyl titanate and 2 mols of lauric acid. 340 g (1 mol) of butyl titanate were placed into a 1000 ml round bottom flask equipped with a stirrer, thermometer and condenser, heated to about 50° C. and admixed in small portions with a total of 400 g (2 mols) of finely powdered lauric acid (dodecanoic acid). The temperature of the reaction mixture was increased to 90° C. to dissolve the lauric acid and maintained at that level for 30 minutes. A yellowish, easily mobile liquid with the following characteristic values was obtained:

| Index of refraction $n_D^{20}$ | 1.473 |
|---|---|
| Viscosity at 20° C. | 42 mPa.s |
| Density at 20° C. | 0.995 g/ml |
| TiO$_2$ content | 10.8% by weight |
| Flash point 31° C. (DIN 51755) | |
| Solubility | |
| (a) water in titanium acylate about 15 g per 100 g | |
| (b) Titanium acylate in water 0.1% | |
| (c) in organic solvents: miscible with alcohols, esters, ketones, aromatic and aliphatic hydrocarbons. | |

EXAMPLE 5

Titanium acylate of propionic acid (2:1) and mixtures with the product of Example 2.

243 g of the propionic acid (2:1) titanium acylate prepared by the method of Example 3 from 2 mols of propionic acid and 1 mol of butyl titanate were added to the reaction mixture of Example 2 by means of the dropping funnel. After 30 minutes of stirring a yellowish liquid with the following characteristic values was obtained:

| | |
|---|---|
| Index of refraction $n_D^{20}$ | 1.45 |
| Viscosity at 20° C. | 36 mPa.s |
| Density at 20° C. | 0.96 g/ml |
| $TiO_2$ content | 13.1% by weight |
| Solubility | |
| (a) in water: 0.1% by weight | |
| (b) in organic solvents: miscible with alcohols, esters and ketones, as well as with aliphatic and aromatic hydrocarbons. | |

2 mols of propionic acid and 1 mol of butyl titanate may also be added to the freshly prepared product of Example 2, and the mixture may be reacted as above to achieve the same result.

EXAMPLE 6

Preparation of mixtures of 1,3-diol titanate and titanium acylates (general procedure).

The component corresponding to the larger proportion in the mixture is placed into a 1000 ml round bottom flask equipped with a stirrer, a thermometer and a dropping funnel, and the second component is dosed in while stirring. After all of the second component has been added the mixture is stirred for 30 minutes more.

EXAMPLE 7

Preparation of a mixed titanium acylate chelate with 2-methyl-pentanediol-2,4 as the diol and octanoic acid as the carboxylic acid component.

A titanium acylate was prepared in a 1000 ml round bottom flask equipped with a stirrer, a thermometer, a dropping funnel and a condenser from 340 g (1.0 mol) of butyl titanate and 288 g (2.0 mols) of octanoic acid, as described in Example 2. The reaction mixture wa cooled to 25° C., and then 118 g (1.0 mol) of 2-methyl-pentanediol-2,4 were stirred into it, and the mixture was heated for 30 minutes at 60° C. After cooling, a yellowish, readily mobile liquid with the following characteristics values was obtained:

| | |
|---|---|
| Index of refraction $n_D^{20}$ | 1.449 |
| Viscosity at 20° C. | 20 mPa.s |
| Density at 20° C. | 0.94 g/ml |
| $TiO_2$ content | 10.7% |
| Flash point | 35° C. (DIN 51 755) |
| Solubility | |
| (a) in water | 0.1% |
| (b) in organic solvents: miscible with alcohols, esters, ketones, aliphatic as well as aromatic hydrocarbons. | |

EXAMPLE 8

Example 2 was repeated, but 2.1 mols of propanediol-1, were reacted as the diol component. The properties of the product corresponded to those of the product of Example 1.

EXAMPLE 9

Example 4 was repeated, but 2 mols of myristic acid were reacted. The properties of the product corresponded to that of the product of Example 4.

EXAMPLE 10

Test of the adhesion-promoting effect of compositions of the instant invention in a nitrocellulose printing ink on polypropylene.

4% by weight of the mixtures according to the present invention were added to a nitrocellulose printing ink which contained 25% nitrocellulose of the Norm type 34 E, dissolved in ethanol/ethylacytate, and titanium dioxide as the white pigment, and the mixture was stirred for a few minutes.

With the aid of a film spreading spiral, the thus modified printing ink was spread with a wet layer thickness of 12 μm on a corona-pretreated polypropylene foil, and after 15 minutes of air drying the coated substrate was dried for 1 minute at 60° C. in a drying chamber with circulating air. Thereafter, the adhesion of the printing ink on the polypropylene was determined by means of the adhesive tape tear-off test:

An adhesive tape strip (for instance Scotch ® tape) was applied to a surface of about 4 cm² of the imprinted substrate, and then the adhesive tape strip was again pulled off in one rapid motion.

Table of Results:

| Additive | % of ink layer torn off with tape |
|---|---|
| Octylene glycol titanate (OGT) according to Example 1 (comparison) | 10% |
| Titanium acylate (according to Example 3) | 25% |
| OGT + titanium acylate (according to Example 3) 1:1 mixture | 1% |
| OGT + titanium acylate (according to Example 4) 3:1 mixture | 1% |
| OGT + titanium acylate (according to Example 3) 1:2 mixture | 4% |
| Composition (according to Example 5) | 4.5% |
| Composition (according to Example 7) | 3.5% |
| Titanium acetylacetonate (comparison) | 5% |

EXAMPLE 11

Test of the color intensifying effect of mixtures according to the invention with a nitrocellulose - maleinate resin varnish.

5% by weight of each of two mixtures according to the present invention were added to a nitrocellulose-maleinate resin varnish which contained 8% by weight of alcohol-soluble nitrocellulose and 10% by weight of a maleinate resin with an acid number of 130 dissolved in ethanol, and the Gardner color number of these varnishes was determined. As a comparison, a varnish sample was admixed with 5% by weight of titanium acetylacetonate:

| Additive | Color number according to Gardner | Color |
|---|---|---|
| None | 8 | yellow |
| Titanium-acetylacetonate | 16 (comparison) | red |
| OGT + titanium acylate (Example 3) 1:1 mixture | 12 | light orange |
| OGT + titanium acylate (Example 4) 3:1 mixture | 10 | light yellowish orange |

Even with a very dark varnish of the color number 8, the composition according to the present invention produce a substantially lesser color intensification than with the addition of titanium acetylacetonate. However, if the compositions of the present invention are added to a light, pure nitrocellulose lacquer, its color is little changed.

EXAMPLE 12

Test of the reaction of mixtures according to the invention with antioxidants.

Upon admixture of butylhydroxyanisol (BHA) solutions with titanium acetylacetonate solutions a strong discoloration takes place. Since such materials as BHA are also contained as antioxidants in foils to be imprinted, the reaction of solutions of the mixtures according to this invention with a BHA-solution were tested: The discoloration is substantially less, and thus the danger of yellowing in printing of foils with printing inks which contain the mixtures according to this invention must be considered as being distinctly less.

Table of Results
(mixture 1% by weight solutions in isopropanol

| Additive | Color number according to Gardner |
|---|---|
| Titanium acetylacetonate | 11 |
| OGT + titanium acylate (Example 3) 1:1 mixture | 5-6 |
| OGT + titanium acylate (Example 4) 3:1 mixture | 5 |

Mixtures of compositions of other examples also resulted in color numbers of 5 to 6.

EXAMPLE 13

Viscosity behavior of a nitrocellulose printing ink after addition o mixtures according to the invention.

The test medium was a white printing ink containing 25% by weight of an ester-soluble nitrocellulose, to which 4% by weight of the compositions to be tested were added. The viscosity was determined with a rotation viscosimeter and the composition was stored between measurements at 50° C.

The test results show a dependency of the viscosity change upon the type of titanium acylate present in the mixture:

In the case of the presence of short-chain carboxylic acids the viscosity after two months of storage is distinctly higher than when a titanium acylate with a long-chain carboxylic acid is used. This viscosity increase, however, reached only those values which are obtained by the addition of titanium acetylacetonate. In the case of acylates of long-chain carboxylic acid the viscosity, after an initial increase and subsequent decrease, changes only very little. This behavior is advantageous in comparison to the titanium acetylacetonate additive.

Table of Results:

| Additive | Viscosity in mPa.s after | | | Storage time at 50° C. | |
|---|---|---|---|---|---|
| | 1 day | 1 week | 2 weeks | 1 month | 2 months |
| Titanium-acetyl-acetonate | 560 | 480 | 480 | 440 | 850 |
| Octylenegylcol-titante (OGT) | 1210 | 540 | 460 | 650 | 1170 |
| OGT + titanium acylate (Example (3) 1:1 | 670 | 480 | 380 | 430 | 1030 |
| OGT + titanium acylate (Example (4) 3:1 | 810 | 420 | 390 | 370 | 480 |

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A titanium chelate composition for improvement of cross-linking and adhesion of coating agents, comprising a mixture of at least one titanium chelate of saturated diols and at least one titanium acylate of saturated monocarboxylic acids, or mixed titanates with diol radicals and monocarboxylic acid radicals, where the alkylenediol groups of the titanium chelates of diols comprise 3 to 12 carbon atoms and the titanium acylates contain monocarboxylic acids with chain lengths of 3 to 16 carbon atoms, said titanium chelates of the diols and the titanium acylates of saturated monocarboxylic acids being present in the composition in a mol ratio of 4:1 to 1:3.

2. A composition of claim 1, additionally containing alcohols, glycols or glycol ethers with 1 to 6 carbon atoms as solvents in amounts up to 60% by weight based on the total weight of the composition.

3. A composition of claim 1, where the alkylenediol groups of the titanium chelate of diols comprises 6 to 10 carbon atoms.

4. A composition of to claim 1, where the titanium chelates of diols comprise two to four alkylenediol groups, and optionally up to two alkoxy groups bonded to each titanium atom.

5. A composition of claim 1, where the titanium chelates of diols comprise three to four alkylenediol groups and optionally up to two alkoxy groups bonded to each titanium atom.

6. A composition of claim 1, where the titanium acylates contain monocarboxylic acids with chain lengths of 3 to 12 carbon atoms.

7. A composition of claim 1, where the titanium acylates contain one to four carboxylic acid radicals and optionally up to three alkoxy groups.

8. A composition of claim 1, where the titanium acylates contain two to three carboxylic acid radicals and optionally up to three alkoxy groups.

9. The method of enhancing the adhesion and cross-linking of binders with reactive groups, which comprises adding to said binders a composition of claim 1.

10. The method of enhancing the properties of solvent-containing printing inks, which comprises adding to said printing inks an effective amount of a composition of claim 1.

* * * * *